April 19, 1932. W. E. ARNDT 1,854,389
TUBE CUTTER
Filed May 12, 1930
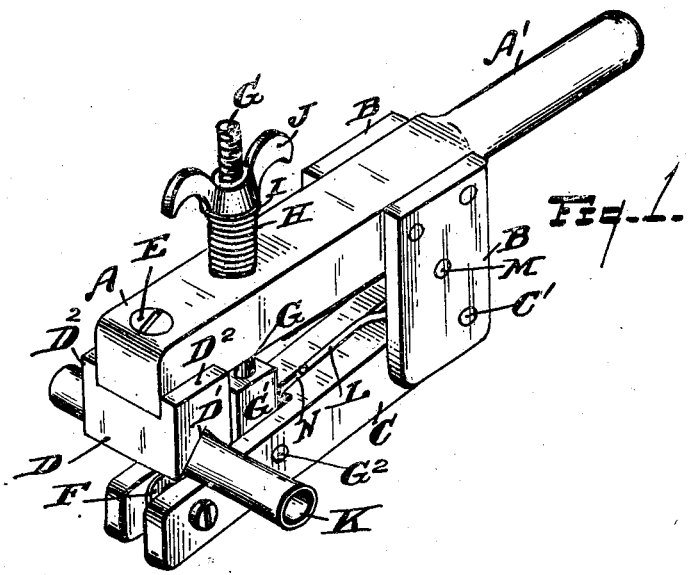
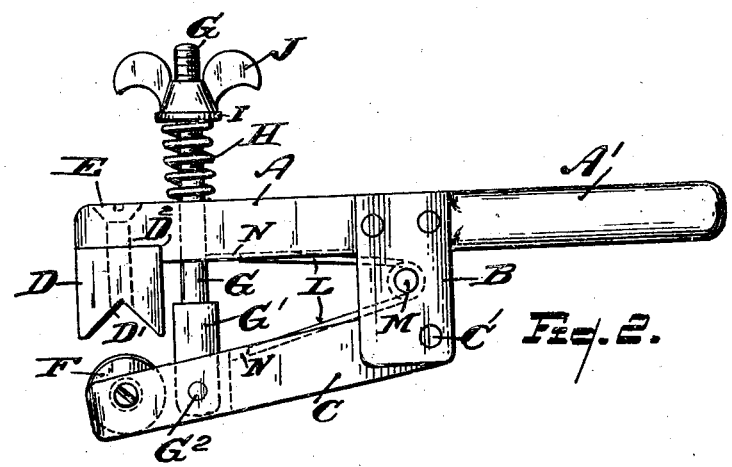
William E. Arndt Inventor
By S. E. Thomas
Attorney Patented Apr. 19, 1932

1,854,389

UNITED STATES PATENT OFFICE

WILLIAM E. ARNDT, OF DETROIT, MICHIGAN, ASSIGNOR, BY MESNE ASSIGNMENTS, TO THE IMPERIAL BRASS MANUFACTURING COMPANY, OF CHICAGO, ILLINOIS, A CORPORATION OF ILLINOIS

TUBE CUTTER

Application filed May 12, 1930. Serial No. 451,637.

My invention relates to a portable pipe cutter for cutting tubing shown in the accompanying drawings and more particularly described in the following specification and claims.

The primary object of this invention is to provide a tube cutter which is adapted to automatically maintain its rotary blade in contact with the wall of the tubing during the entire cutting operation of the tool.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a perspective view of the tool shown as it would appear when cutting a section of tubing.

Figure 2 is a side elevation of the device with the jaw supporting the rotary cutter in expanded position.

Referring now to the letters of reference placed upon the drawings:

The device comprises a frame of which A indicates a bar of rectangular shape in cross-section at one end, the other end being cylindrical in formation to provide a suitable handle $A^1$ for operating the device.

B, B are depending plates secured to the squared portion of the bar A, adjacent to the forward end of the handle.

C is a swinging bar forked at its forward end and pivoted at $C^1$ between the plates B.

D is a seating jaw comprising a block having a V-shaped groove $D^1$ to receive the pipe, with flanges $D^2 D^2$ overlapping the side walls of the bar A to which it is secured by a screw E, extending through the bar and into the block.

F is a rotary cutter mounted between the bifurcated walls of the swinging bar C, and journaled in the walls of the latter.

G denotes a screw bolt having an enlarged head $G^1$ extending between the bifurcated walls of the swinging bar C, being pivoted thereto at $G^2$.

H is a coiled spring sleeved on the bolt G.

I denotes a washer also sleeved upon the bolt and J is a wing-nut mounted on the bolt and adapted when adjusted to bear upon the washer to bring the spring under tension, whereby the rotary cutter is maintained in yieldable cutting relation with the tubing K for cutting the same in predetermined lengths.

L is a spring located between the plates B, supported upon a pin M, extending transversely through the latter. The forward end of the spring L projects into grooves N formed in the opposing faces of the bar A and swinging bar C;—the spring serving to force the swinging jaw away from the bar A upon effecting a releasing adjustment of the wing-nut J.

Having now indicated the several parts by reference letters, the construction and operation of the device will be readily understood.

As indicated in the opening paragraphs of this specification, this tool is designed for cutting tubing and more especially copper or soft metal tubing, it may however be employed for cutting other piping.

The tubing having been inserted transversely in the block D as indicated in Figure 1, the wing-nut is adjusted to bring the rotary cutter into impinging contact with the tube at the point it is desired to sever the tubing. The wing-nut is then further adjusted to compress the spring H, whereby the cutter as it is rotated around the tube will be automatically maintained in cutting relation with the unsevered portion of the wall of the tube until the operation of cutting the tube is completed.

Upon completing the cutting operation, the wing-nut is released in order that the spring L may become effective to force the swinging arm with its cutter away from the tube and seating jaw, the severed tube having been removed, the tool is then ready for another similar operation.

Having thus described my invention, what I claim is:

1. A tool of the character described, comprising a frame including a handle, a substantially straight bifurcated swinging bar pivoted to the frame; a rotary cutter journaled between the forks of the swinging bar; a seating block bolted to the frame, having a wedge-shaped notch to receive a tube to be cut, said seating block having spaced flanges overlapping the sides of the frame, whereby it is held in fixed relation to the frame; a screw threaded bolt pivoted to the swinging bar between the forks of the latter, and extending through a hole in the frame; an adjustable nut screwed upon the bolt; a spring sleeved upon the bolt, adapted when under tension due to the adjustment of said nut to yieldingly maintain the rotary cutter in contact with a tube during the operation of cutting the tube lodged while in the wedge-shaped notch of the seating block; and means for forcing the swinging bar with its rotary cutter into an open position, upon adjusting the nut to release the tension of the spring sleeved upon the bolt.

2. A tool of the character described comprising a frame including a handle, a substantially straight bifurcated swinging bar pivoted to the frame; a rotary cutter journaled between the forks of the swinging bar; a seating block bolted to the frame, having a V-shaped notch to receive a tube to be cut, said seating block having spaced flanges overlapping the sides of the frame, whereby it is held in fixed relation to the frame; a screw threaded bolt pivoted to the swinging bar between the forks of the latter and extending through a hole in the frame; an adjustable nut screwed upon the bolt; a spring sleeved upon the bolt adapted when under tension due to the adjustment of said nut, to yieldingly maintain the rotary cutter in contact with a tube, lodged in the V-shaped notch of the seating block, throughout the operation of cutting; and a second spring located between and bearing respectively upon the frame and the swinging bar, whereby upon adjusting the nut screwed upon the bolt to release the tension of the spring sleeved upon the bolt, the second spring may become active to automatically force the swinging bar with the rotary cutter carried thereby into an "open" non-cutting position.

In testimony whereof, I sign this specification.

WILLIAM E. ARNDT.